United States Patent
Park et al.

(10) Patent No.: US 9,544,836 B2
(45) Date of Patent: Jan. 10, 2017

(54) SCANNING METHOD AND APPARATUS

(71) Applicant: LG Electronics Inc., Seoul (KR)

(72) Inventors: Giwon Park, Anyang-si (KR); Kiseon Ryu, Anyang-si (KR); Hangyu Cho, Anyang-si (KR); Jinsam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/398,608

(22) PCT Filed: May 9, 2013

(86) PCT No.: PCT/KR2013/004103
§ 371 (c)(1),
(2) Date: Nov. 3, 2014

(87) PCT Pub. No.: WO2013/169044
PCT Pub. Date: Nov. 14, 2013

(65) Prior Publication Data
US 2016/0007274 A1    Jan. 7, 2016

Related U.S. Application Data

(60) Provisional application No. 61/644,447, filed on May 9, 2012, provisional application No. 61/814,349, filed on Apr. 22, 2013.

(51) Int. Cl.
*H04W 4/00* (2009.01)
*H04W 48/16* (2009.01)
(Continued)

(52) U.S. Cl.
CPC ............. *H04W 48/16* (2013.01); *H04W 84/12* (2013.01); *H04W 88/08* (2013.01)

(58) Field of Classification Search
CPC ............................ H04W 48/16; H04W 88/08
(Continued)

(56) References Cited

U.S. PATENT DOCUMENTS 7,864,736 B2 * 1/2011 Yashar .................. H04W 48/20
370/332
8,630,220 B2 * 1/2014 Umeuchi .............. H04W 48/16
370/312
(Continued)

FOREIGN PATENT DOCUMENTS

KR    10-2009-0023584 A    3/2009

OTHER PUBLICATIONS

Ryu, Ki Seon et al., "Proposed SFD Text for 802.11ai Prioritized Active Scanning", (Year:2012 Dcn:548 Rev:0), IEEE 802.11 Document, May 4, 2012, <URL=https://mentor.ieee.org/802.11/docuemnts>, 6 pages.
(Continued)

*Primary Examiner* — Kiet Doan
(74) *Attorney, Agent, or Firm* — Dentons US LLP

(57) ABSTRACT

Disclosed are a scanning method and a scanning apparatus. The scanning method for a station (STA) comprises the steps of: transmitting a probe request frame including a scanning priority for a plurality of access points (APs); and sequentially monitoring for the reception of a probe response frame, which is a response to the probe request frame, from at least one of the plurality of Aps for the plurality of APs on the basis of the scanning priority. Thus, scanning processes can be quickly performed.

6 Claims, 15 Drawing Sheets

(A)

(B)

(51) Int. Cl.
　　　*H04W 88/08*　　　(2009.01)
　　　*H04W 84/12*　　　(2009.01)
(58) Field of Classification Search
　　　USPC ..... 455/436, 561, 68, 144, 552.1, 434, 41.2;
　　　　　　　　370/329, 338, 340, 331, 254, 252, 395.2,
　　　　　　　　　　　　　　　　　　　　　370/310, 312
　　　See application file for complete search history.

(56) References Cited

U.S. PATENT DOCUMENTS

| | | | | |
|---|---|---|---|---|
| 2005/0059353 | A1* | 3/2005 | Smith | H04W 24/00 |
| | | | | 455/67.11 |
| 2007/0047492 | A1* | 3/2007 | Kim | H04W 36/0083 |
| | | | | 370/331 |
| 2010/0309815 | A1* | 12/2010 | Yepez | H04L 12/4625 |
| | | | | 370/254 |

OTHER PUBLICATIONS

Lee, Jae Seung et al., "Selective transmission of the Probe Response for 11ai Spec Framework", (Year:2012 Dcn:572 Rev:0), IEEE 802.11 Document, May 4, 2012, <URL=https://mentor.ieee.org/802.11/documents>, 25 pages.

* cited by examiner

FIG. 1
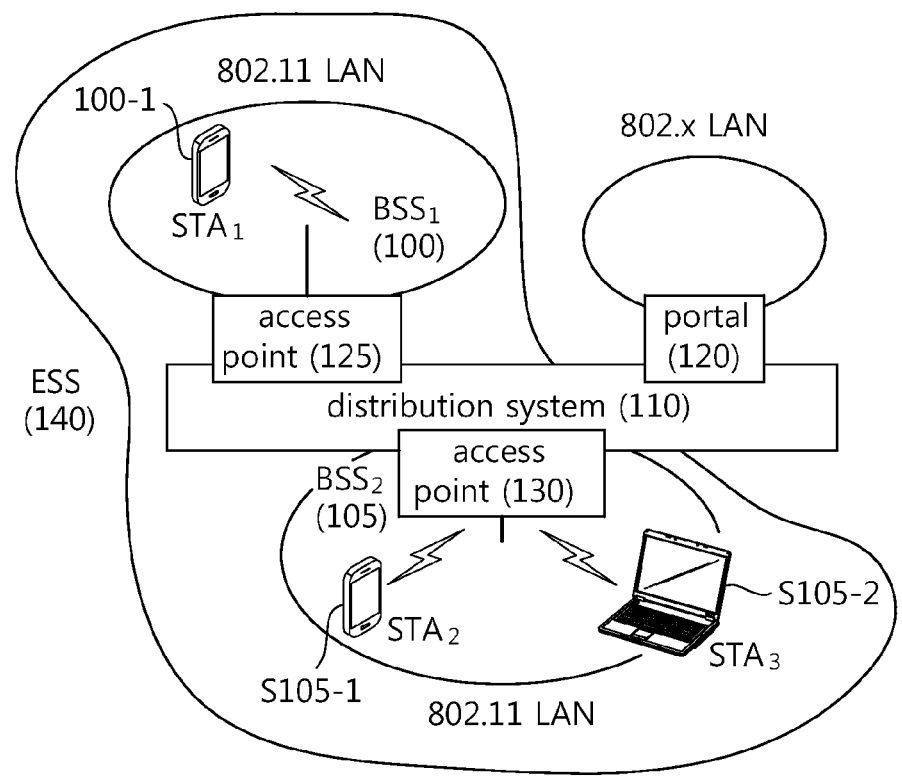
(A)
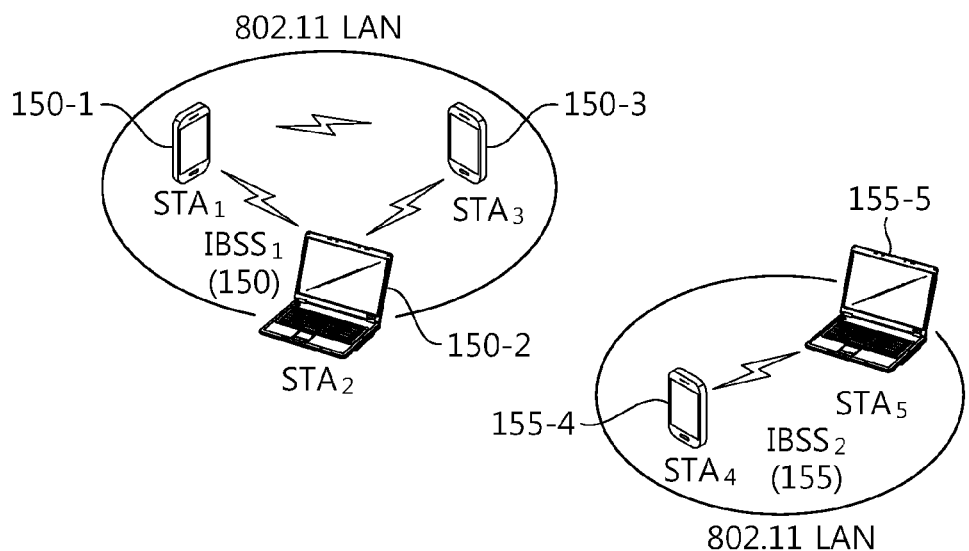
(B)

FIG. 6
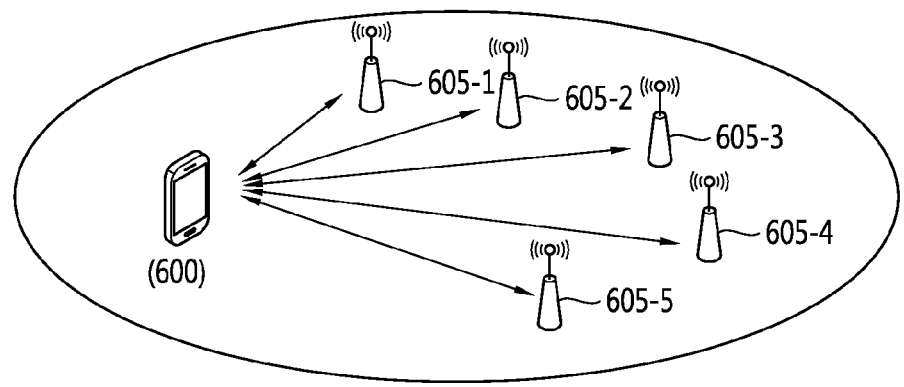
probe request frame (610)
(wildcard, SSID, wildcard BSSID)    (A)
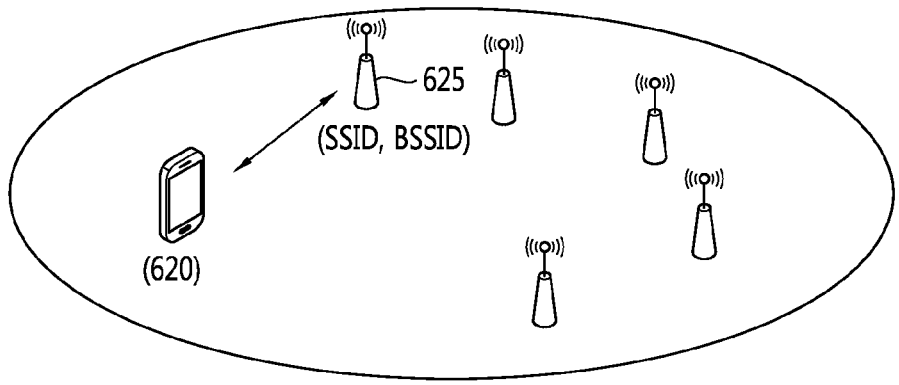
probe request frame (630)
(SSID, BSSID)    (B)
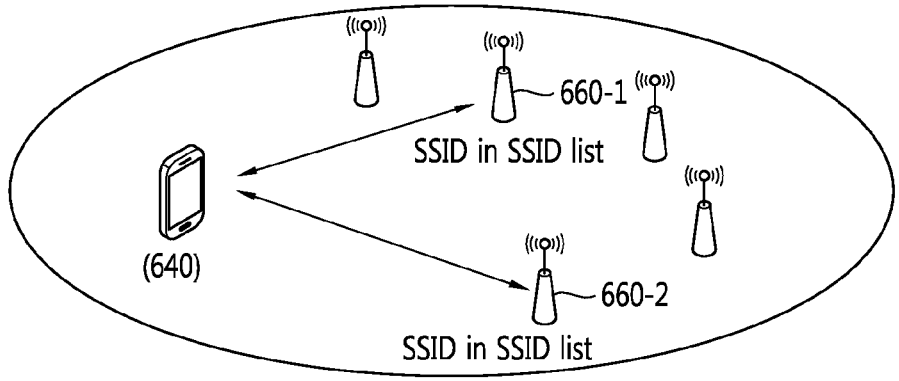
probe request frame (660)
(SSID, wildcard BSSID)    (C)

SCANNING METHOD AND APPARATUS

This Application is a 35 U.S.C. §371 National Stage entry of International Application No. PCT/KR2013/004103, filed May 9, 2013, which claims benefit of Provisional Application No. 61/644,447 filed May 9, 2012 and 61/814,349 filed Apr. 22, 2013, all of which are incorporated by reference in their entirety herein.

BACKGROUND OF THE INVENTION

Field of the Invention

The present invention relates to a scanning method and apparatus and, more particularly, to a method and apparatus for an active scanning or a passive scanning performed by station (STA).

Related Art

Recent Wireless LAN (WLAN) technology is basically evolving into three directions. There are Institute of Electrical and Electronic Engineers (IEEE) 802.11 ac and IEEE 802.11 ad as efforts to further increase the transfer rate on the extension line of the existing WLAN evolution direction. IEEE 802.11 ad is WLAN technology using a 60 GHz band. Furthermore, a wide area WLAN that utilizes a frequency band of less than 1 GHz in order to enable wider area transfer than that of the existing WLAN in distance is recently emerging. The wide-area WLAN includes IEEE 802.11af utilizing a TV White Space (TVWS) band and IEEE 802.11ah utilizing a 900 MHz band. A main object of the wide-area WLANs is to extend extended range Wi-Fi service as well as a smart grid and a wide-area sensor network. Furthermore, the existing WLAN Medium Access Control (MAC) technology is problematic in that an initial link setup time is very long according to circumstances. In order to solve this problem and in order for an STA to rapidly access an AP, IEEE 802.11ai standardization is recently carried out actively.

IEEE 802.11ai is MAC technology in which a rapid authentication procedure is handled in order to significantly reduce the initial setup and association time of a WLAN, and standardization activities for IEEE 802.11 ai has started as a formal task group on January, 2011. In order to enable a rapid access procedure, in IEEE 802.11ai, a discussion on procedure simplification in fields, such as AP discovery, network discovery, Time Synchronization Function (TSF) synchronization, authentication & association, and a procedure convergence with a higher layer, is in progress. From among them, ideas, such as procedure convergence utilizing the piggyback of a Dynamic Host Configuration Protocol (DHCP), the optimization of a full Extensible Authentication Protocol (EAP) using a concurrent IP, and efficient and selective Access Point (AP) scanning, are being actively discussed.

SUMMARY OF THE INVENTION

An object of the present invention is to provide a scanning method.

Another object of the present invention is to provide an apparatus for performing a scanning method.

In an aspect, a scanning method performed by a station (STA) may include transmitting a probe request frame including a scanning priority for multiple access points (APs), and monitoring whether a probe response frame is received as a response to the probe request frame from at least one of the multiple APs sequentially based on the scanning priority. The probe request frame includes a service set identifier (SSID) list representing the multiple APs, and the scanning priority may include the priority for each of the multiple APs.

In another aspect, a wireless apparatus that performs scanning in a wireless LAN system, the wireless apparatus comprising a processor, the processor may be configured to perform transmitting a probe request frame including a scanning priority for multiple access points (APs), and monitoring whether a probe response frame is received as a response to the probe request frame from at least one of the multiple APs sequentially based on the scanning priority. The probe request frame includes a service set identifier (SSID) list representing the multiple APs, and the scanning priority may include the priority for each of the multiple APs.

The scanning procedure can be quickly performed.

BRIEF DESCRIPTION OF THE DRAWINGS

FIGS. 1A and B are conceptual diagrams illustrating the configuration of a Wireless Local Area Network (WLAN).

FIGS. 6A, B and C are conceptual diagrams illustrating a method of transmitting a probe request frame.

DESCRIPTION OF EXEMPLARY EMBODIMENTS

FIG. 1 is a conceptual diagram illustrating the configuration of a Wireless Local Area Network (WLAN).

FIG. 1 (A) shows the configuration of an infrastructure network according to Institute of Electrical and Electronic Engineers (IEEE) 802.11.

Referring to FIG. 1 (A), the WLAN system may include one or more Basic Service Sets (BSSs) 100 and 105. The BSSs 100 and 105, and each is a set of an AP and an STA, such as an Access Point (AP) 125 and a Station (STA1) 100-1 which are successfully synchronized with each other and capable of communicating with each other. The BSS is not a concept indicative of a specific area. The BSS 105 may include one or more STAs 105-1 and 105-2 that may be associated in one AP 130.

An infrastructure BSS may include at least one STA, the APs 125 and 130 providing distribution service, and a Distribution System (DS) 110 coupling a plurality of APs.

The distribution system 110 may implement an Extended Service Set (ESS) 140 by coupling some BSSs 100 and 105. The ESS 140 may be used as a term that indicates one network over which one or more APs 125 and 230 are connected through the distribution system 110. APs included in one ESS 140 may have the same service set identification (SSID).

A portal 120 may function as a bridge for connecting between a WLAN network (i.e., IEEE 802.11) and another network (e.g., 802.X).

In an infrastructure network, such as that of the upper portion (A) of FIG. 1, a network between the APs 125 and 130 and a network between the APs 125 and 130 and the STAs 100-1, 105-1, and 105-2 may be implemented. However, a network may be configured between STAs so that the STAs may perform communication even without the APs 125 and 130. A network that is configured between STAs so that the STAs may perform communication without the APs 125 and 130 is defined as an Ad-Hoc network or an independent Basic Service Set (BSS).

FIG. 1 (B) is a conceptual diagram illustrating an independent BSS.

Referring to FIG. 1 (B), the Independent BSS (IBSS) is a BSS that operates in an Ad-Hoc mode. The IBSS does not include a centralized management entity because it does not include an AP. That is, in the IBSS, STAs 150-1, 150-2, 150-3, 155-4, and 155-5 are managed in a distributed manner. In the IBSS, all the STAs 150-1, 150-2, 150-3, 155-4, and 155-5 may be mobile STAs, and they form a self-contained network because they cannot access a distribution system.

An STA is a specific function medium, including Medium Access Control (MAC) that complies with the rules of the IEEE 802.11 standard and a physical layer interface for a radio medium, and may be used as a meaning that includes both an AP STA and a non-AP STA in a broad sense.

An STA may be called in various names, such as a mobile terminal, a wireless device, a Wireless Transmit/Receive Unit (WTRU), a User Equipment (UE), a Mobile Station (MS), a mobile subscriber unit, or simply a user.

Figure 2:
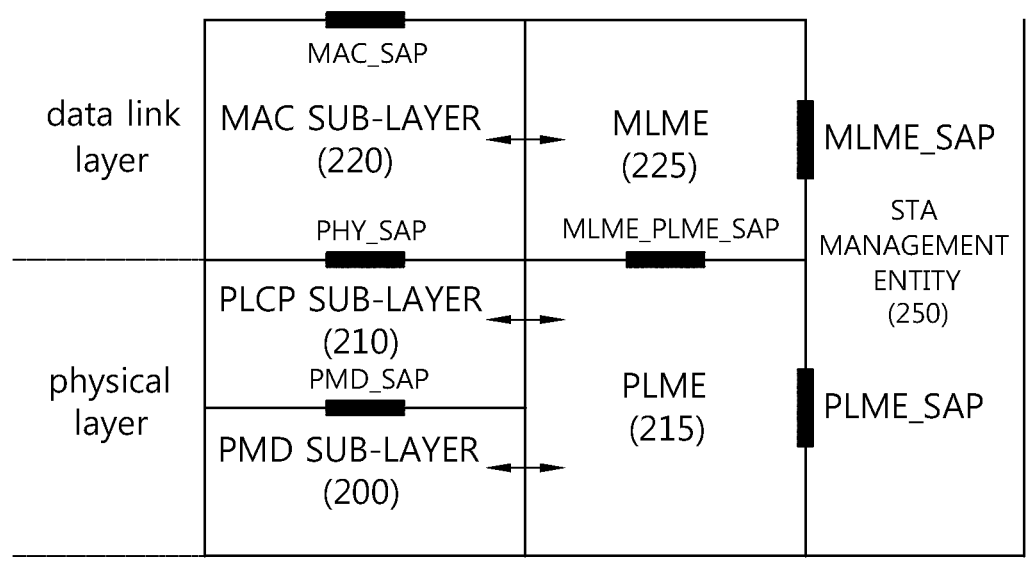
FIG. 2 is a diagram illustrating the hierarchical architecture of a WLAN system that is supported by IEEE 802.11.

FIG. 2 is a diagram illustrating the hierarchical architecture of a WLAN system that is supported by IEEE 802.11.

FIG. 2 schematically shows the PHY architecture of the WLAN system.

The PHY architecture of the WLAN system may include a Medium Access Control (MAC) sublayer 220, a Physical Layer Convergence Procedure (PLCP) sublayer 210, and a Physical Medium Dependent (PMD) sublayer 200. The PLCP sublayer 210 is implemented so that the MAC sublayer 220 may operate with minimum dependency on the PMD sublayer 200. The PMD sublayer 200 may function as a transmission interface through which data is transmitted and received between a plurality of STAs.

The MAC sublayer 220, the PLCP sublayer 210, and the PMD sublayer 200 may include a management entity conceptually.

The management entity of the MAC sublayer 220 is called a MAC Layer Management Entity (MLME) 225, and the management entity of the PHY layer is called a PHY Layer Management Entity (PLME) 215. The management entities may provide interfaces through which a layer management operation is performed. The PLME 215 is connected to the MLME 225 and capable of performing the management operation of the PLCP sublayer 210 and the PMD sublayer 200. The MLME 225 may also be connected to the PLME 215 and capable of performing the management operation of the MAC sublayer 220.

In order for a correct MAC layer operation to be performed, an STA Management Entity (SME) 250 may be existed. The SME 250 may operate as an element unit that is independent of the layer. In the MLME, the PLME, and the SME, information may be transmitted and received between element units based on primitives.

An operation in each sublayer is disclosed below in brief. The PLCP sublayer 210 transfers a MAC Protocol Data Unit (MPDU), received from the MAC sublayer 220, to the PMD sublayer 200 or transfers a frame, received from the PMD sublayer 200, to the MAC sublayer 220 under the instruction of the MAC layer between the MAC sublayer 220 and the PMD sublayer 200. The PMD sublayer 200 may transmit and receive data between a plurality of STAs through a radio medium as a PLCP lower layer. The MPDU transferred by the MAC sublayer 220 is called a Physical Service Data Unit (PSDU) in the PLCP sublayer 210. The MPDU is similar to the PSDU, but each MPDU may be different from each PSDU if an Aggregated MPDU (A-MPDU) in which a plurality of MPDUs are aggregated is transferred.

The PLCP sublayer 210 adds an additional field, including information necessary for a physical layer transmitter/receiver, in a process of receiving the PSDU from the MAC sublayer 220 and transferring the received PSDU to the PMD sublayer 200. Here, the added field may be a PLCP preamble, a PLCP header, and tail bits necessary to return a convolution encoder to a zero state in the PSDU. The PLCP preamble may function to enable a receiver to prepare a synchronization function and antenna diversity before the PSDU is transmitted. A data field may include padding bits, a service field including a bit sequence for initializing a scrambler, and a coded sequence encoded from a bit sequence to which tail bits have been added in the PSDU. Here, Binary Convolutional Coding (BCC) encoding or Low Density Parity Check (LDPC) encoding may be selected as an encoding method depending on an encoding method supported for an STA that receives a PLCP Protocol Data Unit (PPDU). The PLCP header may include a field including information about the PPDU.

In the PLCP sublayer 210, the PPDU is generated by adding the above-described field to the PSDU and transmitted to a reception STA via the PMD sublayer 200. The reception STA receives the PPDU, obtains information necessary to restore data from the PLCP preamble and the PLCP header, and restores the data using the information.

Figure 3:
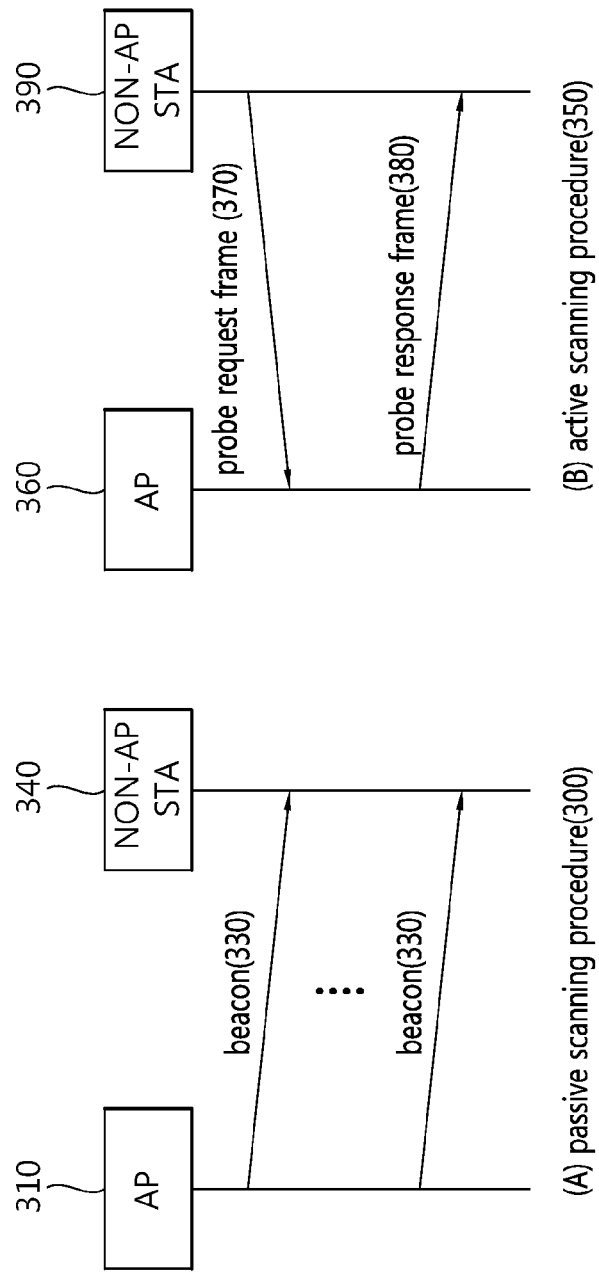
FIGS. 3A and B are conceptual diagrams illustrating a scanning method in a WLAN.

FIG. 3 is a conceptual diagram illustrating a scanning method in a WLAN.

Referring to FIG. 3, the scanning method may be divided into a passive scanning procedure 300 and an active scanning procedure 350.

Referring to FIG. 3 (A), the passive scanning procedure 300 may be performed in response to a beacon frame 330 that is periodically broadcasted by an AP 310. The AP 310 of a WLAN broadcasts the beacon frame 330 to a non-AP STA 340 in a specific cycle (e.g., 100 msec). The beacon frame 330 may include information about a current network. The non-AP STA 340 may receive the periodically broadcasted beacon frame 330, receive network information from the beacon frame 330, and perform scanning on a channel along with the AP 310 with which an authentication/association process will be performed based on the network information.

In the passive scanning method 300, the non-AP STA 340 has only to receive the beacon frame 330 transmitted by the AP 310 without transmitting a frame. Accordingly, the passive scanning procedure 300 is advantageous in that overall overhead generated due to the transmission and reception of data over a network is small. However, the passive scanning procedure 300 is disadvantageous in that the time taken to perform scanning is increased because scanning is inevitably manually performed in proportion to the cycle of the beacon frame 330. A detailed description of the beacon frame is disclosed in 8.3.3.2 Beacon Frame of IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter referred to as IEEE 802.11)' disclosed on November, 2011. In IEEE 802.11ai, a beacon frame having another format may be additionally used, and this beacon frame may be called a (Fast Initial Link Setup (FILS)) beacon frame. Furthermore, a measurement pilot frame is a frame that uses only some information of the beacon frame and may be used in a scanning procedure. The measurement pilot frame is disclosed in an IEEE 802.11 8.5.8.3 measurement pilot format.

Referring to FIG. 3 (B), the active scanning procedure 350 refers to a method in which a non-AP STA 390 initiatively performs scanning by transmitting a probe request frame 370 to an AP 360.

After receiving the probe request frame 370 from the non-AP STA 390, the AP 360 may wait for a random time in order to prevent a collision between frames, include network information in a probe response frame 380, and transmit the probe response frame 380 to the non-AP STA 390. The non-AP STA 390 may obtain the network information based on the received probe response frame 380 and stop the scanning process.

The active scanning procedure 350 is advantageous in that the time taken to perform scanning is short because the non-AP STA 390 initiatively performs scanning. However, the active scanning procedure 350 is disadvantageous in that network overhead for the transmission and reception of frames is increased because the non-AP STA 390 needs to transmit the probe request frame 370. The probe request frame 370 is disclosed in Paragraph IEEE 802.11 8.3.3.9, and the probe response frame 380 is disclosed in Paragraph IEEE 802.11 8.3.3.10.

After terminating the scanning, the AP and the STA may perform authentication and association processes.

Figure 4:
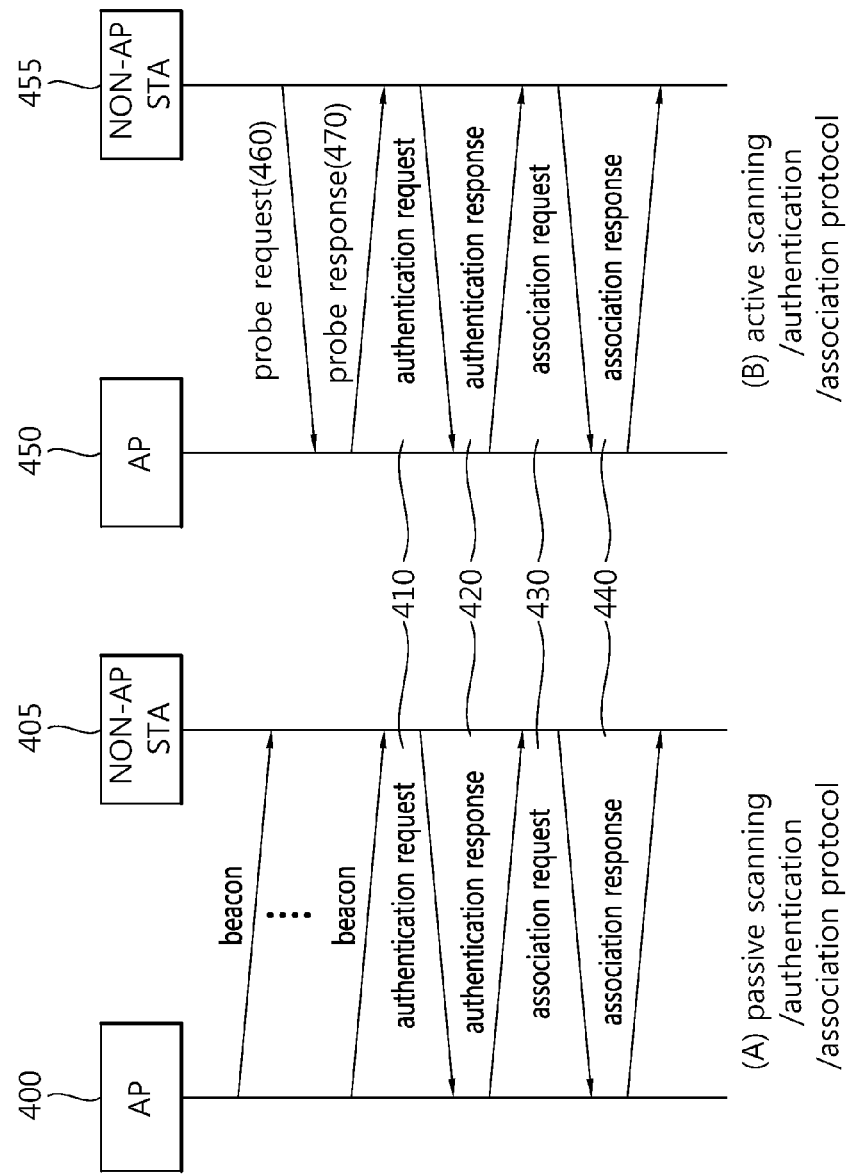
FIGS. 4A and B are conceptual diagrams illustrating authentication and association processes after the scanning of an AP and an STA.

FIG. 4 is a conceptual diagram illustrating authentication and association processes after the scanning of an AP and an STA.

Referring to FIG. 4, after passive/active scanning is performed, authentication and association processes may be performed with one of scanned APs.

The authentication and association processes may be performed, for example, by way of 2-way handshaking. The left portion (A) of FIG. 4 is a conceptual diagram illustrating authentication and association processes after passive scanning, and the right portion (B) of FIG. 4 is a conceptual diagram illustrating authentication and association processes after active scanning.

The authentication and association processes may be equally performed by exchanging an authentication request frame 410/an authentication response frame 420 and an association request frame 430/an association response frame 440 between APs 400 and 450 and non-AP STAs 405 and 455 irrespective of whether an active scanning method or a passive scanning method has been used.

The authentication process may be performed when the non-AP STAs 405 and 455 transmit the authentication request frame 410 to the respective APs 400 and 450. In response to the authentication request frame 410, the APs 400 and 450 may transmit the authentication response frame 420 to the respective non-AP STAs 405 and 455. An authentication frame format is disclosed in IEEE 802.11 8.3.3.11.

The association process may be performed when the non-AP STAs 405 and 455 transmit the association request frame 430 to the respective APs 400 and 450. In response to the association request frame 430, the APs 400 and 450 may transmit the association response frame 440 to the respective non-AP STAs 405 and 455. The transmitted association request frame 430 includes information about the capabilities of the non-AP STAs 405 and 455. The APs 400 and 450 may determine whether support for the non-AP STAs 405 and 455 is possible or not based on the capability information of the non-AP STAs 405 and 455. If, as a result of the determination, it is determined that support for the non-AP STAs 405 and 455 is possible, the APs 400 and 450 may include information about whether or not the association request frame 430 has been accepted, a reason for the acceptance, and information about capabilities supportable by the APs 400 and 450 in the association response frame 440 and transmit the association response frame 440 to the non-AP STA 405 and 455. An association frame format is disclosed in IEEE 802.11 8.3.3.5/8.3.3.6.

If up to the association process is performed, data is normally transmitted and received. If the association process is not performed, association is performed again based on a reason that the association process has not been performed, or association with another AP may be performed.

Figure 5:
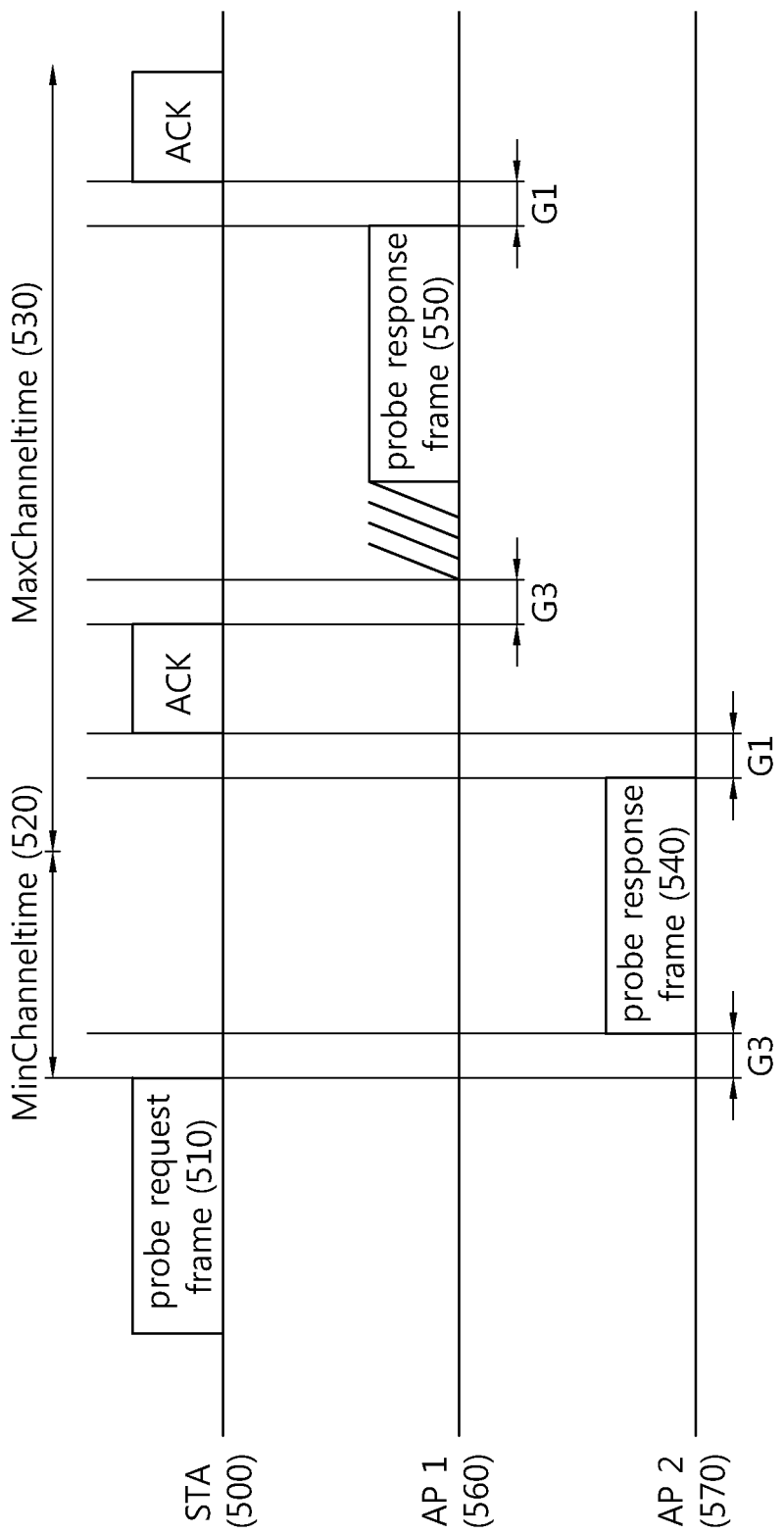
FIG. 5 is a conceptual diagram illustrating an active scanning procedure.

FIG. 5 is a conceptual diagram illustrating an active scanning procedure.

Referring to FIG. 5, the active scanning procedure may be performed in accordance with the following steps.

(1) Determine whether or not an STA 500 is ready to perform the active scanning procedure.

The STA 500 may perform active scanning, for example, when a probe delay time expires or after waiting until it receives specific signaling information (e.g., PHY-RX-START. indication primitive).

The probe delay time is delay generated before the STA 500 transmits a probe request frame 510 when performing active scanning. The PHY-RXSTART.indication primitive is a signal that is transmitted from a PHY layer to a local MAC layer. The PHY-RXSTART.indication primitive may signal information, indicating that a PLCP Protocol Data Unit (PPDU) including a valid Physical Layer Convergence Protocol (PLCP) header has been received from a PLCP, through the MAC layer.

(2) Perform basic access.

In the 802.11 MAC layer, several STAs may share a radio medium using, for example, a Distributed Coordination Function (DCF) that is a contention-based function. The DCF may prevent a collision between STAs through a back-off scheme using Carrier Sense Multiple Access/Collision Avoidance (CSMA/CA) as an access protocol. The STA 500 may transmit the probe request frame 510 to APs 560 and 570 in accordance with a basic access method.

(3) Include information (e.g., service set identification (SSID) and basic service set identification (BSSID) information) for specifying the APs 560 and 570, included in an MLME-SCAN.request primitive, in the probe request frame 510 and transmit the probe request frame 510.

The BSSID is an indicator for specifying APs, and the BSSID may have a value corresponding to the MAC address of the AP. The SSID is a network name for specifying APs, which may be read by a person who operates an STA. The BSSID and/or the SSID may be used to specify APs.

The STA 500 may specify APs based on the information for specifying the APs 560 and 570, which is included in the MLME-SCAN.request primitive. The specified APs 560 and 570 may transmit respective probe response frames 550 and 540 to the STA 500. The STA 500 may unicast, multi-cast, or broadcast the probe request frame 510 by transmitting the probe request frame 510 including information about an SSID and BSSID. A method of unicasting, multi-casting, or broadcasting the probe request frame 510 based on the SSID and BSSID information will be additionally described with reference to FIG. 5.

For example, if an SSID list is included in the MLME-SCAN.request primitive, the STA 500 may transmit the probe request frame 510 including the SSID list. The APs 560 and 570 may receive the probe request frame 510, determine SSIDs included in the SSID list that has been included in the received probe request frame 510, and determine whether or not to transmit the probe response frames 550 and 540 to the STA 500 based on the determined SSIDs.

(4) Reset a Probe Timer to 0 and Drive the Probe Timer.

The probe timer may be used to check a minimum channel time (MinChanneltime) 520 and a maximum channel time (MaxChanneltime) 530. The minimum channel time 520 and the maximum channel time 530 may be used to control the active scanning operation of the STA 500.

The minimum channel time 520 may be used for the STA 500 to perform an operation of changing a channel on which active scanning is performed. For example, if the STA 500 has not received the probe response frames 550 and 540 until the probe timer reaches the minimum channel time 520, the STA 500 may change a current scanning channel into another scanning channel and perform scanning on another channel. If the STA 500 receives the probe response frame 550 before the probe timer reaches the minimum channel time 520, when the probe timer reaches the maximum channel time 530, the STA 500 may process the received probe response frames 540 and 550.

The STA 500 may discover a PHY-CCA.indication primitive before the probe timer reaches the minimum channel time 520 and determine whether or not other frames (e.g., the probe response frames 540 and 550) have been received before the minimum channel time 520.

The PHY-CCA.indication primitive may transmit information about the state of a medium from a physical layer to a MAC layer. The PHY-CCA.indication primitive may inform the state of a current channel using a channel state parameter indicative of a busy state (simply called busy) when a channel is not available and of an idle state (simply called idle) when a channel is available. If the PHY-CCA.indication is discovered to be busy, the STA 500 may determine that the probe response frames 550 and 540 received by the STA 500 are existed. If the PHY-CCA.indication is discovered to be idle, the STA 500 may determine that the probe response frames 550 and 540 received by the STA 500 are not existed.

If the PHY-CCA.indication is discovered to be idle, the STA 500 may set a Net Allocation Vector (NAV) to 0 and scan a next channel. If the PHY-CCA.indication is discovered to be busy, the STA 500 may perform processing on the probe response frames 550 and 540 that are received after the probe timer reaches the maximum channel time 530. After performing processing on the received probe response frames 550 and 540, the STA 500 may set the NAV to 0 and scan a next channel.

In the following embodiments of the present invention, to determine whether the probe response frames 550 and 540 received by the STA 500 are existed or not may include the meaning that a channel state is determined using the PHY-CCA.indication primitive.

(5) An MLME may signal an MLME-SCAN.confirm primitive if all channels included in a channel list (ChannelList) are scanned. The MLME-SCAN.confirm primitive may include BSSDescriptionSet that includes all pieces of information obtained in a scanning process.

If an active scanning method is used, the STA 500 may perform monitoring for determining whether the PHY-CCA.indication parameter is busy or not until the probe timer reaches the minimum channel time.

Detailed information included in the MLME-SCAN.request primitive is as follows. An STA may receive the MLME-SCAN.request primitive from the MLME in order to perform scanning. The MLME-SCAN.request primitive is generated by the SME. The MLME-SCAN.request primitive may be used to determine whether another BSS with which an STA will be associated is present or not.

The MLME-SCAN.request primitive may include pieces of information, such as BSSType, BSSID, SSID, ScanType, ProbeDelay, ChannelList, MinChannelTime, MaxChannelTime, RequestInformation, SSID List, ChannelUsage, AccessNetworkType, HSSID, and MeshID, VendorSpecificInfo. A detailed description of the MLME-SCAN.request primitive is disclosed in 6.3.3.2 MLME-SCAN.request of IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications' disclosed on November, 2011.

Table 1 below schematically shows information included in the MLME-SCAN.request primitive.

TABLE 1

| Name | Description |
|---|---|
| BSSType | Determines whether an infrastructure BSS, IBSS, Mesh Basic Service Set (MBSS) or all of them are included in the scan. |
| BSSID | Identifies a specific or wildcard BSSID. |
| SSID | Specifies a desired SSID or a wildcard SSID. |
| Scan Type | Indicates either active or passive scanning. |
| ProbeDelay | Delay (in microseconds) to be used before transmitting a probe frame during active scanning. |
| ChannelList | Specifies a list of channels that are examined when scanning a BSS. |
| MinChannelTime | A minimum time (in TU) to spend on each channel when scanning. |
| MaxChannelTime | A maximum time (in TU) to spend on each channel when scanning. |
| RequirementInformation | This element is optionally present if dot11RatioMeasurementActivated is true and is placed in a probe request frame to request that a responding STA includes requested information in the probe response frame. |
| SSID List | One or more SSID elements that are optionally present when dot11RatioMeasurementActivated is true. |
| ChannelUsage | Specifies request types for a ChannelUsage request. |
| AccessNetworkType | Specifies a desired specific access network type or a wildcard access network type. This field is present when dot11InterworkingServiceActivated is true. |
| HESSID | Specifies a desired specific HESSID network identifier or a wildcard network identifier. This field is present when dot11InterworkingServiceActivated is true. |
| Mesh ID | Only present if BSSType = MESH or BSSType = ANY_BSS Specifies a desired Mesh ID or a wildcard Mesh ID. |
| RequestParameters | This parameter defines responding STAs. |
| ReportingOption | Indicate a result reporting mode. |
| APConfigurationChangeCount | When a specific BSSID is indicated in the MLME-SCAN-request, the APConfigurationChangeCount associated with the stored configuration of an AP is optionally provided. |
| VendorSpecificInfo | Information individually added according to a service provider. |

A request parameter included in the MLME-SCAN.request.primitive may be used to determine whether or not a responding STA will transmit a probe response frame. The request parameter may include information to request that the information of another BSS be included in the probe response frame. The request parameter may further include a report request field, a delay reference field, and a maximum delay limit field.

The report request field is information to request that information of another BSS be included in the probe response frame. The delay reference field may include information about a delay type that is applied as a response to the probe request frame. The maximum delay limit field may include maximum access delay information about a delay type which is indicated by the delay reference field.

In addition, the request parameter may further include a minimum data rate field or a received signal intensity limit field or both. The minimum date rate field includes information about the lowest total data rate in transmitting an MSDU or an A-MSDU. The received signal intensity limit field may include information about the limit value of a signal that is necessary for the receiver of the probe request frame to respond to the probe request frame.

FIG. 6 is a conceptual diagram illustrating a method of transmitting a probe request frame.

FIG. 6 discloses a method of an STA broadcasting, multi-casting, or unicasting, a probe request frame.

FIG. 6 (A) shows a method of an STA 600 broadcasting a probe request frame 610.

The STA 600 may include a wildcard SSID and a wildcard BSSID in the probe request frame 610 and then broadcast the probe request frame 610.

The wildcard SSID and the wildcard BSSID may be used as identifiers for indicating all APs 605-1, 605-2, 605-3, 605-4, and 605-5 which are included in the transmission coverage of the STA 600.

If the STA 600 transmits the probe request frame 610 including the wildcard SSID and the wildcard BSSID, the APs 605-1, 605-2, 605-3, 605-4, and 605-5 may transmit probe response frames to the STA 600 in response to the probe request frame 610.

If the APs 605-1, 605-2, 605-3, 605-4, and 605-5 transmit the probe response frames to the STA 600 within a specific time in response to the broadcasted probe request frame 610, a problem may occur because the STA 600 has to receive too many probe response frames and process the received probe response frames at once.

FIG. 6 (B) is a method of an STA 620 unicasting a probe request frame 630.

Referring to FIG. 6 (B), if the STA 620 unicasts the probe request frame 630, the STA 620 may transmit the probe request frame 630 including information about a specific SSID/BSSID of an AP. Only an AP 625 corresponding to the SSID/BSSID specified by the STA 620, from among APs which have received the probe request frame 630, may transmit a probe response frame to the STA 620.

FIG. 6 (C) is a method of an STA 640 multi-casting a probe request frame 660.

Referring to FIG. 6 (C), the STA 640 may include an SSID list and a wildcard BSSID in the probe request frame 660 and then transmit the probe request frame 660. APs 660-1 and 660-2 corresponding to SSIDs included in the SSID list that has been included in the probe request frame 660, from among APs which have received the probe request frame 660, may transmit probe response frames to the STA 640.

As shown in FIG. 6 (B) and FIG. 6 (C), when the STA unitcasts/multicast the probe request frame, the STA cannot receive the probe response frame from the AP that corresponds to the SSID which is specified in the probe request frame transmitted from the STA. In such a case, the STA that does not receive the probe response frame moves to another scanning channel and scans APs in the scanning channel. The STA that receives the probe response frame from the AP, even in case of receiving the probe response from a wanted AP within minimum channel time (MinChannelTime), may wait till maximum channel time (MaxChannelTime), and then perform the process for the probe response frame received. Accordingly, when the STA performs the active scanning, unnecessary delay may occur. Therefore, in the active scanning method according to an embodiment of the present invention, a method which may decrease unnecessary delay that occurs when the conventional STA performs the active scanning and quickly combinable with an AP will be described. In addition, a method which can solve the problem that a STA receives too many probe response frame in a specific time section in the conventional active scanning method will be described.

Hereinafter, the scanning frame which is used in the embodiments of the present invention represents the frame that a STA uses for the scanning procedures. The scanning frame may include, for example, a probe response frame, a beacon frame, a fast initial link setup (FILS) beacon frame, a measurement pilot frame, and so on.

Figure 7:
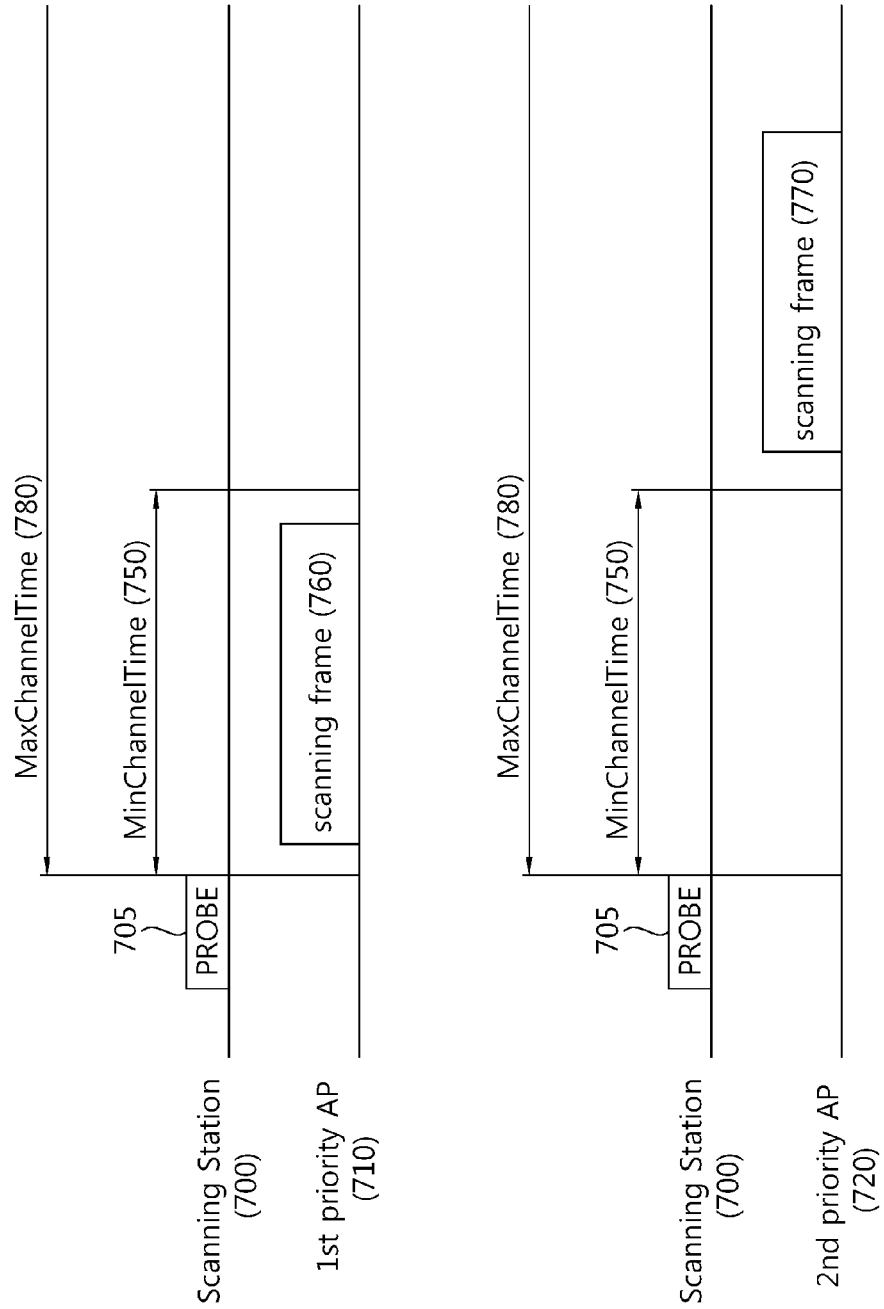
FIG. 7 is a conceptual diagram illustrating the active scanning method according to an embodiment of the present invention.

FIG. 7 is a conceptual diagram illustrating the active scanning method according to an embodiment of the present invention.

In FIG. 7, the scanning STA (hereinafter, STA) 700 that performs scanning may transmit the probe request frame 705 by specifying at least one AP where the probe response frame is to be transmitted.

In the probe request frame 705 that is transmitted by the STA, the information for specifying an AP where the probe response frame, which is one of the scanning frame 760, is to be transmitted may be included as the response to the probe request frame 705. For example, as the information for specifying the AP, desired SSID, desired BSSID, network ID, link performance information (i.e., received signal strength indication (RSSI) threshold value), QoS requirement information, and so on may be included in the probe request frame. Hereinafter, in an embodiment of the present invention, the information for specifying an AP where the probe response frame is to be transmitted will be represented by the term, AP filtering information.

For example, the STA 700 may transmit the SSID list information with being included in the probe request frame 705. The SSID list may be a list that includes an identifier of the AP where the probe response frame will be transmitted. The STA 700 may transmit the probe request frame that additionally includes the information for the AP that the STA 700 wants to preferentially scan among the SSID list. The SSID list that includes the information for the AP that the STA 700 wants to preferentially scan may be called the multiple desired SSID list.

For example, when generating the multiple desired SSID list, the STA 700 may transmit the SSID of a first AP and the SSID of a second AP with being sequentially included. The order of the AP included in the multiple desired SSID list may mean the order that the AP transmits the probe response frame to the STA 700 preferentially. The order of the AP included in the multiple desired SSID list may be the information for specifying the order of priority of transmitting the probe response frame to the STA 700 or the time (channel time) when transmitting the probe response frame of the AP. For example, if specifying the order of priority as two different orders of priority, the AP included in a specific order of priority in the multiple desired SSID list may be a first priority AP 710. The AP that is not included in the specific order of priority in the multiple desired SSID list may be a second priority AP 720. This is an example that specifies the order of priority of AP in two steps. The AP may be specified with two or more different orders of priority.

As another example, by indexing an element identifier (ID, i.e., SSID) included in the SSID list, the order of priority of the AP may be specified based on the index value. For example, the order of priority of the AP indicated by the order of index size may be decided or the order of priority of the AP may be configured to be same for the indices within a specific range. As an example, if 5 element IDs are included in the SSID list for specifying AP, the order of priority may be specified by indexing the 5 element IDs. The order of priority may be specified such that 2 element IDs among the 5 element IDs have the same index 0 and 3 element IDs among the 5 element IDs have the same index 1. In case that the index that corresponds to the SSID of AP is 0 based on the index information of the SSID list, it may be known that the AP corresponds to the first priority AP. In addition, in case that the index that corresponds to the SSID of AP is 1, it may be known that the AP corresponds to the second priority AP. The STA may transmit the information that specifies the relation between the SSID of AP included in the SSID list and the order of priority of the AP that corresponds to the corresponding SSID with being additionally included in the probe request frame.

This is an example of specifying the order of priority of the AP based on the SSID, the order of priority of the AP may be specified by another method based on the element ID included in the SSID list.

When deciding the order of priority of the AP, the STA may decide the order of priority on various standards. For example, the priority of AP configured by time based on a specific life pattern of a STA user may be adaptively changed. For example, if the STA user is located in office on a specific time and located in home on a specific time, the priority of AP processed in the office and the home may be differently configured based on the pattern information. As another example, the information of AP processed on the corresponding location is acquired based on the location information and the priority of AP may be determined. That is, the STA may determine the priority of AP by various methods and transmit it with being included in the probe request frame.

Hereinafter, in an embodiment of the present invention, the case that a STA specifies the priority of AP with two steps is assumed and described for the convenience of description.

For example, if two SSIDs are included in the multiple desired SSID list, the first AP located on the first position may be configured to the first priority AP 710, and the second AP located on the second position may be configured to the second priority AP 720. The first priority AP 710 and the second priority AP 720 may configure the probe response frame such that the section (or channel time) for transmitting it to the STA 700 is different from each other. For example, the first priority AP 710 may transmit the probe response frame to the STA 700 within the minimum channel time (MinChannelTime) 750 and the second priority AP 720 may transmit the probe response frame to the STA 700 after the minimum channel time 750 is over. The minimum channel time 750 is an example of standard for distinguishing the time when the probe response frame being transmitted by two APs whose priorities are different. That is, as a standard for distinguishing the time when transmitting the probe response frame by two APs whose priorities are different, another unit of time, not the minimum channel time 750 may be used.

From the point of view of an AP, in case that the first AP is the first priority AP 710 and the second AP is the second priority AP 720, the APs may perform the operations below.

The first AP may receive the probe request frame 705 which is transmitted from the STA 700. The first AP may acquire the information of the multiple desired SSID list which is included in the probe request frame 705 by demodulating the probe request frame 705. The first AP may acquire the information whether the identifier information of the first AP is included and the information of the transmission priority of the probe response frame of the first AP based on the multiple desired SSID list. Based on the information acquired, the first AP may determine that it is the first priority AP 710. In this case, the first AP may transmit the probe response frame at the minimum channel time 750 to the STA 700. The information of the minimum channel time 750 may be included in the probe request frame which is transmitted from the STA 700.

In case that the transmission time for other scanning frame returns at the minimum channel time 750, the first priority AP 710 may transmit other scanning frame instead of the probe response frame. For example, the other scanning frame may include the beacon frame, the fast initial link setup (FILS) beacon frame, the measurement pilot frame, and so on. That is, in case that an AP may transmit other scanning frame and the STA 700 may perform the passive scanning, the STA 700 cannot transmit the probe response frame separately. As another example, even in case that the transmission time for other scanning frame returns at the minimum channel time 750, the first priority AP 710 may transmit the probe response frame separately.

The second AP, like the first AP, may acquire the information of whether to transmit the probe response frame and timing of transmitting the probe response frame based on the multiple desired SSID list included in the probe request frame 705 which is transmitted from the STA 700. As a result of the determination of the second AP, in case that the identifier information of the second AP is included in the multiple desired SSID list and the second AP is the second priority AP 720 that has the second priority, the second AP may transmit the probe response frame to the STA 700 after the minimum channel time 750 is over.

Although the first priority AP 710 may specify the time for transmitting the probe response frame as the minimum channel time 750, the first priority AP 10 may also transmit the probe response frame after the minimum channel time 750 is over. That is, the first priority AP 710 may transmit the probe response frame after the minimum channel time 750 is over as well as at the minimum channel time 750.

Also, in case of the frame transmitted with a specific cycle such as the beacon frame, the fast initial link setup (FILS) beacon frame and the measurement pilot frame, the frame may be transmitted regardless of the specific transmission time according to the priority of AP. For example, in case that the transmission cycle of the beacon frame is recurred at the minimum channel time 750, the second priority AP 720 may transmit the beacon frame.

That is, according to an embodiment of the present invention, the order of transmitting the probe response frame to the STA may be determined by setting the priority of the AP which is included in the multiple desired SSID list. By using such a method, the transmission time of the probe response frame of multiple STAs may be dispersed. Accordingly, the phenomenon that the probe response frame is crowdedly transmitted at a specific time may be prevented.

In FIG. 7, the first priority AP and the second priority AP are assumed to be one each, however, the APs that are included in the first priority AP and the second priority AP may be multiple APs and such an embodiment is also included in the embodiments of the present invention.

For example, in the multiple desired SSID list, the first AP and the second AP are configured to the first priority AP, and multiple APs such as the third AP and the fourth AP may be configured to the second priority AP. In this case, the first AP and the second AP which are the first priority AP may transmit the probe response frame to the STA within the minimum channel time. The third AP and the fourth AP which are the second priority AP may transmit the probe response frame to STA after the minimum channel time has passed.

Additionally, as described previously, the priority that the probe response frame is transmitted by the AP may be further departmentalized as to the third priority AP and the fourth priority AP as well as to the first priority AP and the second priority AP. In such a case, for example, the section to which the probe response frame is transmitted may be divided into 4 sections according to the order of priority. The section to which each of the first priority AP, the second priority AP, the third priority and the fourth priority transmit the probe response frame may be configured by being divided into the first minimum channel time, the second minimum channel time, the third minimum channel time and the fourth minimum channel time. The respective time may be specified as the time in which the AP corresponding to each priority transmits the probe response frame. That is, the AP of a specified order of priority may not allow transmitting the probe response frame except a specified transmission time. For another example, even after a specified time, the AP corresponding to each priority may transmit the probe response frame. For example, the first AP may transmit the probe response frame after the first minimum channel time, and the second AP may transmit it after the second minimum channel time.

As a method of the probe response frame transmission of still another AP, the AP that transmits it after the first priority AP such as the second AP may transmit the frame including the timing information in advance ahead of transmitting the probe response frame. For example, the second AP may transmit the scanning response frame including the whole information (e.g., probe response frame) after transmitting the frame that is including the transmission timing information. That is, according to the embodiments of the present invention, the AP corresponding to the lower priority may transmit the frame including the timing information in advance at the time when the AP in higher priority transmits the probe response frame.

Figure 8:
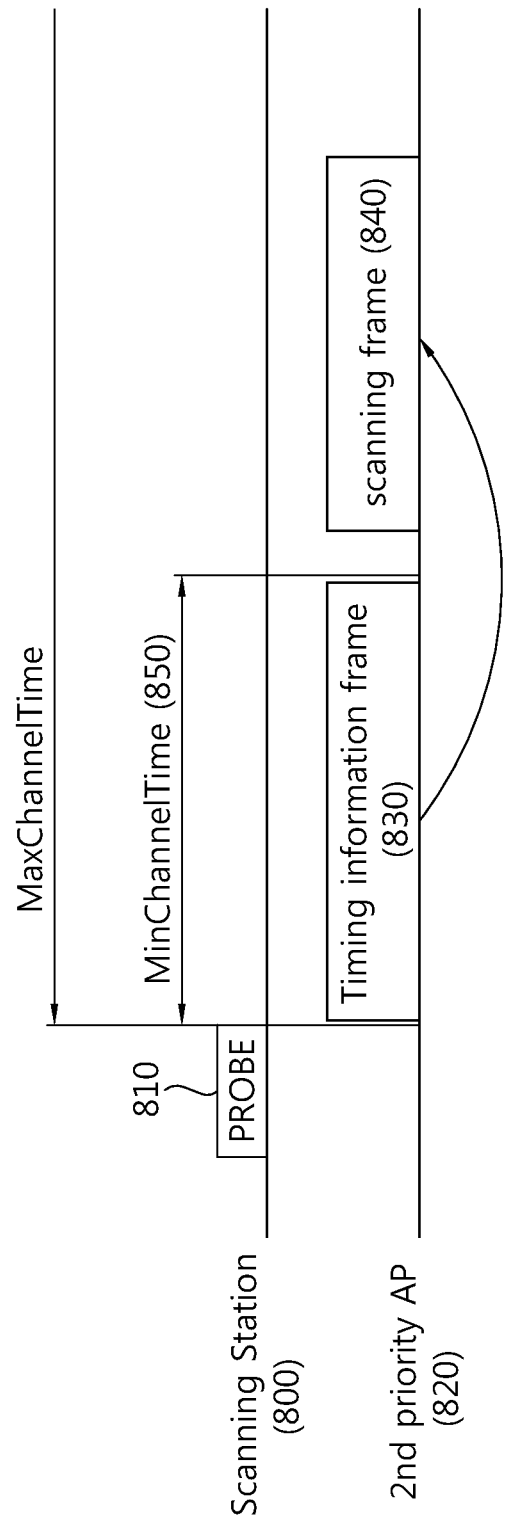
FIG. 8 is a conceptual diagram illustrating the probe response frame transmission method of the AP in lower priority than the first priority according to an embodiment of the present invention.

FIG. 8 is a conceptual diagram illustrating the probe response frame transmission method of the AP in lower priority than the first priority according to an embodiment of the present invention.

In FIG. 8, it is described to be assumed that the AP in the higher priority is the first priority AP, and the AP in the lower priority is the second priority AP.

Referring to FIG. 8, the second priority AP 820 may transmit the timing information frame 830 before transmitting the scanning frame 840.

The timing information frame 830 that the second priority AP 820 transmits indicates the frame including the information of the timing at which the scanning frame 840 is transmitted. The scanning frame 840 may be a probe response frame, a beacon frame, a FILS beacon frame, a measurement pilot frame, and so on. The timing information frame 830 may include the information of the timing at which such a scanning frame 840 is transmitted. STA 800 may acquire the information of the timing at which the scanning frame 840 is transmitted based on the timing information frame 830. The time when the second priority AP 820 transmits the timing information frame 830 to the STA 800 may be either a specified time or the time when the first priority AP transmits the scanning frame such as the minimum channel time 850.

The second priority AP 820 may transmit the scanning frame 840 after the scanning frame transmission timing of the first priority AP has lapsed. STA 800 may receive the scanning frame 840 from the second priority AP 820 based on the timing information acquired. That is, STA 800 may receive the scanning frame 840 from the second priority AP 820 at specific point of time by monitoring based on the timing information acquired.

In order to specify the priority of the AP that transmits the probe request frame when the STA transmits the probe response frame, a variety of information may be transmitted with being included in the probe request frame. For example, the priority response field may be redefined. The priority response field included in the probe request frame allows the AP that is included in the SSID list to determine whether to transmit the probe response frame based on the priority or without consideration of the priority.

In addition, the priority information of the probe response frame of the AP may be determined based on the SSID list or included in the probe request frame with being newly defined as an additional field. Also, in case that the STA separately set up the information of the time when the AP of different priority transmits the probe response frame, such a time information may be also included in the probe request frame and transmitted. The aforementioned information may be included in the probe request frame as an independent field type, but a different format is also allowed.

The information of the priority of the AP, that of the response time, and so on may be included in the primitive such as a MLME-SCAN.request primitive. The STA may generate the probe request frame including the information of the priority of the AP and that of the response time based on the MLME-SCAN.request primitive. That is, the STA may generate the probe request frame including the information of the AP response order and the response time based on the information included in the primitive.

Figure 9:
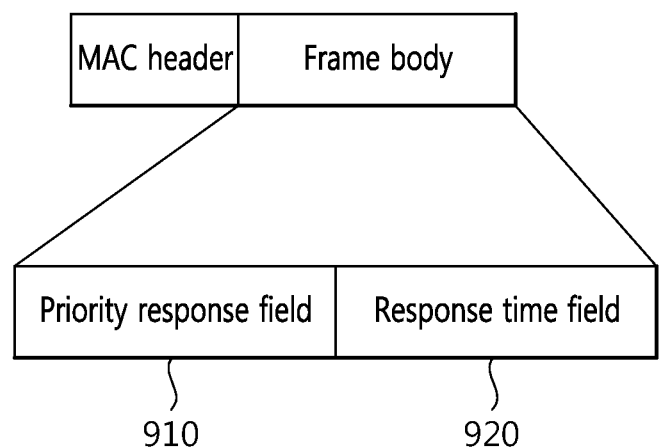
FIG. 9 is a conceptual diagram illustrating the probe request frame according to an embodiment of the present invention.

FIG. 9 is a conceptual diagram illustrating the probe request frame according to an embodiment of the present invention.

Referring to the FIG. 9, the probe request frame may include at least one field of the priority response field 910 and the response time field 920.

The priority response field 910 may include the information of whether the AP that receives the probe request frame transmits the probe response frame based on the priority. For example, in case of the priority response field 910 is 1 as flag information, the AP may transmit the probe response frame based on the priority, but in case of the priority response field 910 is 0 as flag information, the AP transmit the probe response frame regardless of the priority. The priority order of the AP may be determined based on the identifier's order of the AP included in the SSID list. In case that the operation of performing the transmission of the probe response frame based on the priority among APs is not optional, the probe request frame may not include the priority response field 910.

The response time field 920 may include the information of the time section when the AP preferentially transmits the probe response frame. For example, the information of the section in which the first priority AP transmits the probe response frame to STA may be included. In case that the section in which the first priority AP transmit the probe response frame to the STA is predetermined (for example, determined as to the minimum channel time), the response time field 920 may not be included in the probe request frame separately.

Also, as another example of the probe request frame, the priority of the AP that transmits the probe response frame may be determined based on the additional field information. In this case, the information of the priority may be specified based on the additional field information.

For another example, the priority response field 910 may be the field that is not including the flag information but including the information of the time section in which the first priority AP performs the probe response. For example, in case that the priority response field 910 is not existed or the information that is specified to the priority response field 910 is 0, the STA doesn't accord the priority to the AP but receive the probe response frame from the AP. It may be considered that a specific value that is included in the priority response field 910 is the information of the time section in which the first priority AP performs the probe response.

That is, the probe request frame according to the embodiment of the present invention may include at least one of the information of whether the AP transmits the probe response frame according to the priority based on a variety of information formats, the information of the priority of the AP that transmits the probe response frame, the information of the tine section in which the probe response frame is transmitted according to the priority.

According to another embodiment of the present invention, the STA may perform different operations according to whether the STA receives the probe response frame from a specific AP through the multiple desired SSID list or the desired SSID. Hereinafter, in the embodiment of the present invention, for the convenience of description, the AP indicated by the multiple desired SSID or the desired SSID is represented to a target AP and the section where the target AP transmit the probe response frame is represented to a first minimum channel time. Also, the AP that the STA does not specify through the multiple desired SSID list or the desired SSID is defined to be a non-target AP and the section where receiving the probe response frame which is transmitted from the non-target AP is defined to be a second minimum channel time. For example, the first minimum channel time and the second minimum channel time are the time unit that the minimum channel time is equally divided.

Figure 10:
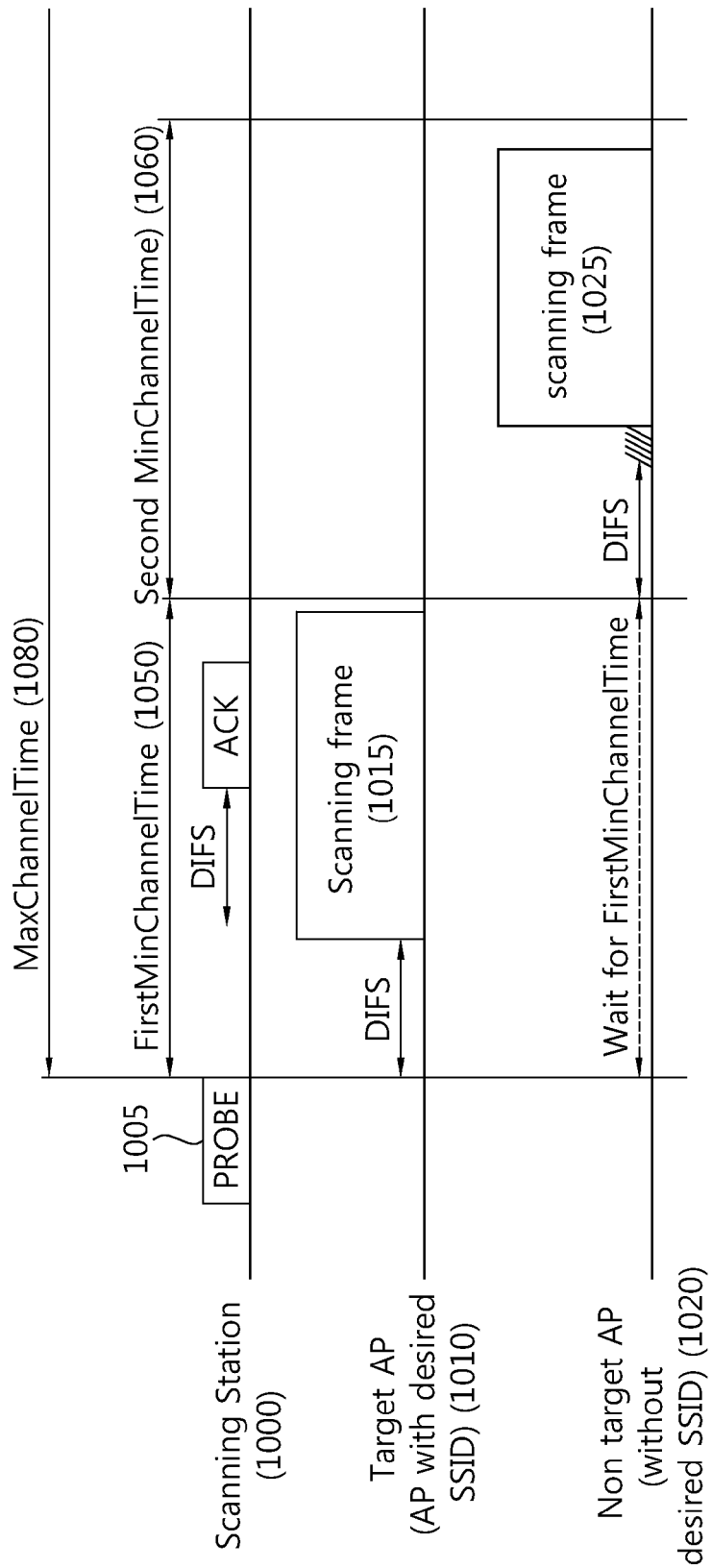
FIG. 10 is a conceptual diagram illustrating the scanning procedure between an AP and a STA according to an embodiment of the present invention.

FIG. 10 is a conceptual diagram illustrating the scanning procedure between an AP and a STA according to an embodiment of the present invention.

The target AP 1010 and the non-target AP 1020 may be distinguished according to whether it is specified through the multiple desired SSID list or the desired SSID which is included in the probe request frame 1005.

In FIG. 10, the case that the target AP 1010 and the non-target AP 1020 transmit the scanning frame (i.e., the probe response frame; 1015 and 1025) to the STA 1000 in a specific section and the STA 1000 receives the scanning frame 1015 and 1025 from the target AP 1010 or the non-target AP 1020 in a specific time section.

(1) The case that the STA 1000 receives the scanning frame 1015 from the target AP 1010 at the first minimum channel time (duration) 1050

The STA 1000 may monitor the scanning frame 1015 which is transmitted from the target AP 1010 at the first minimum channel time 1050. The STA 1000 receives the scanning frame 1015 which is transmitted from the target AP 1010 and processes it, and may terminate the scanning procedure. In the conventional active scanning method, the STA 1000 has processed the scanning frame received by waiting for maximum channel time 1080. However, according to an embodiment of the present invention, in the active scanning procedure, the STA 1000 may terminate the scanning procedure by receiving the scanning frame 1015 such as the probe response frame which is transmitted by the target AP 1010 and immediately processing the scanning frame 1015 received. The STA 1000 may additionally perform the authentication and association process with the target AP 1010 based on the scanning frame 1015 which is transmitted from the target AP 1010 at the corresponding channel.

(2) The case that the STA 1000 is unable to receive the scanning frame 1015 from the target AP 1010 at the first minimum channel time 1050

The STA 1000 may not receive the scanning frame 1015 from the target AP 1010. For example, in case that the target AP 1010 is unable to transmit the probe response frame within the first minimum channel time 1050 to the STA 1000, the STA 1000 may monitor the scanning frame 1025 such as the probe response frame which is transmitted from the non-target AP 1020 for the second minimum channel time (duration) 1060. The non-target AP 1020 may indicate the AP which is not indicated through the multiple desired request SSID list or the desired SSID. The non-target AP 1020 may be implemented to receive the probe request frame from the STA 1000 and to transmit the probe response frame after the first minimum channel time 1050. The scanning frame transmitted from the target AP 1010 may be consistently monitored even after the first minimum channel time 1050.

(3) The case that the STA 1000 is unable to receive the scanning frame 1015 and 1025 from the target AP 1010 and the non-target AP 1020

The STA 1000 may not receive the probe response frame for the time section that corresponds to the first minimum channel time and the second minimum channel time. Also, as a result that the STA 1000 checks the information of the state of medium which is transmitted from the PHY layer to the MAC layer based on the primitive information such as the PHY-CCA.indication primitive for the time section that corresponds to the first minimum channel time and the second minimum channel time, the state of medium may not be detected to be CCA busy. In such a case, the STA 1000 may switch the channel performing scanning to another channel and perform scanning after the time section that corresponds to the first minimum channel time and the second minimum channel time is over.

As another example, even in case that the STA 1000 is unable to receive the probe response frame for the time section that corresponds to the first minimum channel time and the second minimum channel time, the state of medium may be detected to be CCA busy. In this case, the STA 1000 performs scanning for the corresponding channel till the maximum channel time 1080 and if the scanning channel received for the maximum channel time 1080 exists, the STA 1000 may process the scanning frame received.

According to whether the AP is the target AP 1010 or the non-target AP 1020, the AP may perform different operations as below.

(1) Target AP 1010

The target AP 1010 may receive the probe request frame 1005 from the STA 1000 and transmit the scanning frame (i.e., the probe response frame; 1015) to the STA 1000 at the first minimum channel time 1050. The section when the target AP 1010 transmits the scanning frame 1015 may be specified as the first minimum channel time 1050. Also, the later time including the first minimum channel time 1050 may be the section when the target AP 1010 transmits the scanning frame 1015.

(2) Non-target AP 1020

After receiving the probe request frame 1005 from the STA 1000 and the first minimum channel time is over, the non-target AP 1020 may transmit the scanning frame (i.e., the probe response frame; 1025) to the STA 1000 at the second minimum channel time 1060. The STA 1000 receives the probe response frame which is transmitted from the target AP 1010 at the minimum channel time 1050 and immediately processes it, then may terminate the scanning procedure. Accordingly, in case that the target AP 1010 transmits the probe response frame, the non-target AP 1020 is not required to transmit the probe response frame at the second minimum channel time 1060.

Accordingly, the non-target AP 1020 may overhear the probe response frame that the target AP 1010 transmits. If the target AP 1010 transmits the probe response frame at the first minimum channel time 1050 and the non-target AP 1020 overhears it, the non-target AP 1020 may terminate the procedure for transmitting the probe response frame.

When transmitting the probe request frame, the STA may additionally include the information of whether to separately setup the time for transmitting the probe response frame by the AP which is additionally requested. For example, the target AP may determine whether to preferentially transmit the probe response frame based on the prior response field which is newly defined field. In addition, the STA may separately configure the information of the time for receiving the probe response frame from the target AP and the information of the time for receiving the probe response frame from the non-target AP, and include it in the probe request frame. In this case, the information of the first minimum channel time and the second minimum channel time for receiving the probe response frame may also be included in the probe request frame and transmitted. Such information may be included in the probe request frame as an independent field form though, may also be included as a different format form.

The information of whether to preferentially transmit the requested AP, the first minimum channel time and the second minimum channel time may be included in the same primitive as the MLME-SCAN.request primitive. The STA may include and generate the information of whether to preferentially transmit the requested AP, the first minimum channel time and the second minimum channel time based on the information included in the primitive in the probe request frame.

Figure 11:
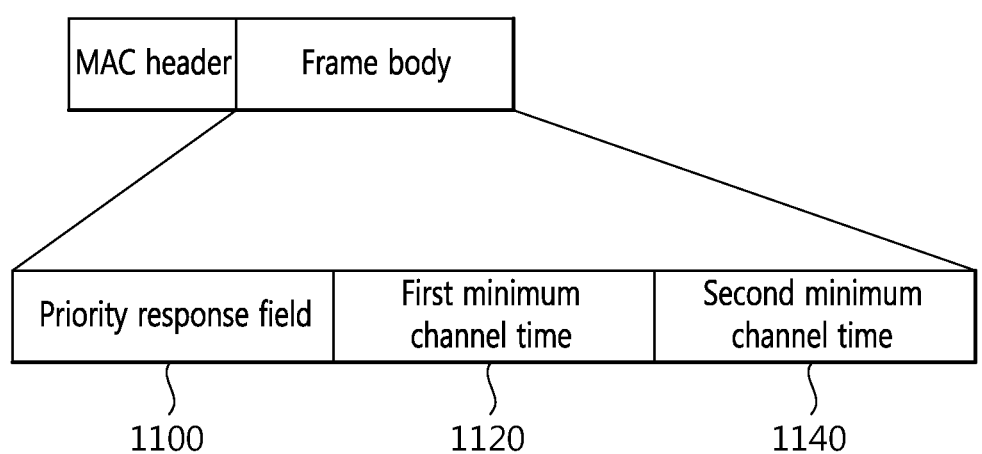
FIG. 11 is a conceptual diagram illustrating the probe request frame according to an embodiment of the present invention.

FIG. 11 is a conceptual diagram illustrating the probe request frame according to an embodiment of the present invention.

Referring to FIG. 11, the probe request frame may include at least one of a priority response field 1100, a first minimum channel time field 1120, and a second minimum channel time field 1140 in the frame body.

The priority response field 1100 may include the information of whether the target AP that is instructed by the probe request frame preferentially transmits the probe response frame at a specific time. For example, in case that the priority response field 1100 is 1 as flag information, the target AP may preferentially transmit the probe response frame at a specific time. In case that the priority response field 1100 is 0, the AP that receives the probe request frame may transmit the probe response frame to the STA regardless of whether the AP is a target AP or a non-target AP.

The first minimum channel time field 1120 may include the information of a specified time when the target AP preferentially transmits the probe response frame. The second minimum channel time field 1140 may include the information of a specified time when the non-target AP transmits the probe response frame. This field is an example and may be included in the probe request frame with the information as such being in another format.

According to whether the AP is a target AP or a non-target AP, the scanning procedure between the STA and the AP based on the first minimum channel time and the second minimum channel time may apply to the first priority AP and the second priority AP as well in the same way. Hereafter, in the embodiments of the present invention, a method will be described that the probe response frame is transmitted in the first minimum channel time and the second minimum channel time based on the priority of the AP.

Figure 12:
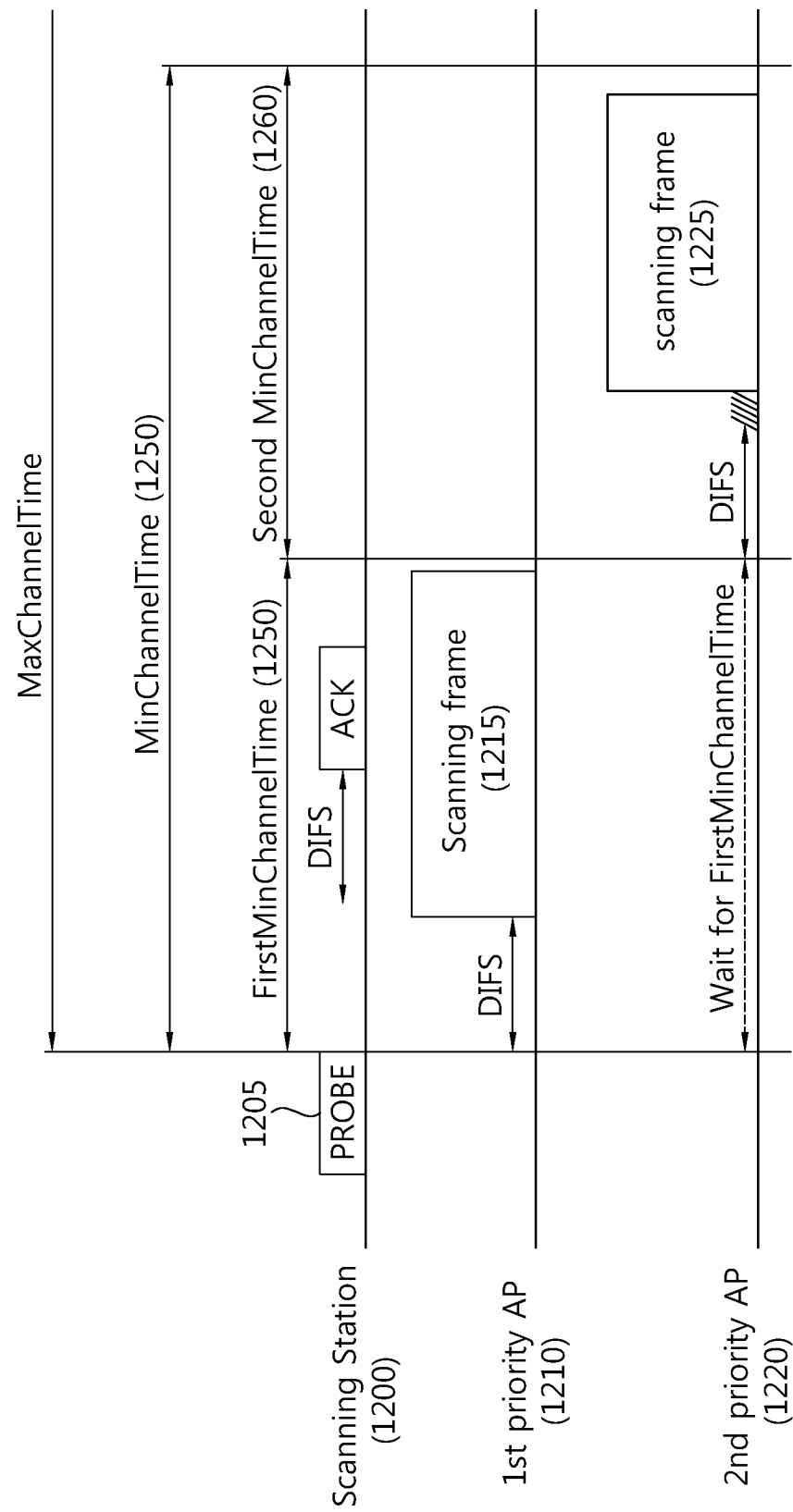
FIG. 12 is a conceptual diagram illustrating the scanning procedure between an AP and a STA according to an embodiment of the present invention.

FIG. 12 is a conceptual diagram illustrating the scanning procedure between an AP and a STA according to an embodiment of the present invention.

The AP that receives the probe request frame 1205, for example, may determine whether it is a first priority AP 1210 or a second priority AP 1220 based on the multiple desired SSID list.

FIG. 12 illustrates a method that the scanning frame 1215 (for example, the probe response frame) is transmitted from the first priority AP 1210 and the second priority AP 1220 to the STA 1200. The first priority AP 1210 may transmit the probe response frame to the STA 1200 at the first minimum channel time (duration) 1250. The second priority AP 1220 may transmit the probe response frame to the STA 1200 at the second minimum channel time (duration) 1260.

The STA 1200 may perform an operation as below depending on whether the scanning frames 1215 and 1225 are received from the first priority AP 1210 and the second priority AP 1220.

(1) In case that the STA 1200 receives the scanning frame 1215 from the first priority AP 1210 at the first minimum channel time 1250

The STA 1200 may monitor the scanning frame 1215 that is transmitted from the first priority AP 1210 at the first minimum channel time 1250. The STA 1210 may receive the scanning frame 1215 that is transmitted by the first priority AP 1210 and end the active scanning procedure. The conventional STA has waited by the maximum channel time and processes the scanning frame that is received after that. According to an embodiment of the present invention, however, the STA 1200 may end the scanning procedure of the corresponding channel right after processing the scanning frame 1215 that is transmitted by the first priority AP 1210. The STA 1200 may additionally perform the authentication and association procedure with the first priority AP 1210 in the corresponding channel based on the scanning frame 1215 that is transmitted by the first priority AP 1210.

(2) In case that the STA 1200 may not receive the scanning frame 1215 by the first priority AP 1210 at the first minimum channel time 1250

The STA 1200 may not receive the scanning frame 1215 from the first priority AP 1210 at the first minimum channel time 1250. The STA 1200 may monitor the scanning frame 1225 that is transmitted by the second priority AP 1220 at the second minimum channel time 1260. The STA 1200 may end the scanning procedure after receiving the scanning frame 1225 that is transmitted by the second priority AP 1220 at the minimum channel time 1260. That is, the STA 1200 may terminate the scanning procedure at the corresponding channel by processing the scanning frame 1225 that is transmitted by the second priority AP 1220 right away instead of having waited by the maximum channel time for processing the received scanning frame 1225. The scanning frame that is transmitted by the first priority AP 1210 may be kept monitoring as well after the first minimum channel time 1250.

In case that the STA 1200 may not receive the scanning frames 1215 and 1225 from the first priority AP 1210 and the second priority AP 1220.

The STA 1200 may not receive the scanning frames 1215 and 1225 during the time united the first minimum channel time 1250 and the second minimum channel time 1260. In this case, as the result of judging from the primitive that the STA 1200 transmits the information of the medium state from the PHY layer such as PHY-CCA.indication primitive to the MAC layer, the medium state may not be in CCA busy. In this case, the STA 1200 may perform the scanning by shifting the channel that performs the scanning to another channel.

In case that the STA 1200 may not receive the probe response frame during the time united the first minimum channel time 1250 and the second minimum channel time 1260, the medium state that is detected from the primitive may be in CCA busy. In this case, the STA 1200 may process the scanning frame received by the maximum channel time by performing the scanning of the corresponding channel until the maximum channel time.

The AP may perform different operations in transmitting the probe response frame to the STA according to whether it is a first priority AP 1210 or a second priority AP 1220.

(1) The first priority AP 1210

The first priority AP 1210 may receive the probe request frame 1205 from the STA 1200 and transmit the scanning frame (e.g., the probe response frame) 1215 to the STA 1200 within the first minimum channel time 1250. The section that the first priority AP 1210 transmits the scanning frame 1215 may be specified as the first minimum channel time 1250. Also, the subsequent time including the first minimum channel time 1250.

(2) The second priority AP 1220

The second priority AP 1220 may receive the probe request frame 1205 from the STA 1200 and transmit the scanning frame (e.g., the probe response frame) 1210 to the STA 1200 at the second minimum channel time 1260 after the first minimum channel time 1250 has passed.

As described previously, in case that the probe response frame is received from the AP at the first minimum channel time 1250 or the second minimum channel time 1260, the scanning procedure may be terminated quickly by immediately processing the probe response frame received.

In case that the first priority AP 1210 transmits the probe response frame, the second priority AP 1220 is not supposed to transmit the probe response frame at the second minimum channel time 1260. Therefore, the second priority AP 1220 may overhear the probe response frame that is transmitted by the first priority AP 1210. If the first priority AP 1210 transmits the probe response frame at the first minimum channel time 1250, and the second priority AP 1220 overhears it, the second priority AP 1220 may terminate the procedure for transmitting the probe response frame.

The STA may include the priority response field that includes the information of whether to specify the AP that preferentially transmits the probe response frame in the SSID list or not when transmitting the probe request frame. In addition, the STA may set up the information of the time when the probe response frame is received from the first priority AP and the information of the time when the probe response frame is received from the second priority AP separately. In this case, the information of the first minimum channel time and the second minimum channel time when the probe response frame is received may also be included in the probe request frame and transmitted. Such information may be included in the probe request frame in an independent type but may be included in a different format as well.

The information of whether the AP requested is to be preferentially transmitted and that of the first minimum channel time and the second minimum channel time may be included in the primitive such as MLME-SCAN.request primitive. The STA may include whether the AP is to be preferentially transmitted in the probe request frame and the information of the first minimum channel time and the second minimum channel time based on the information included in the primitive.

Figure 13:
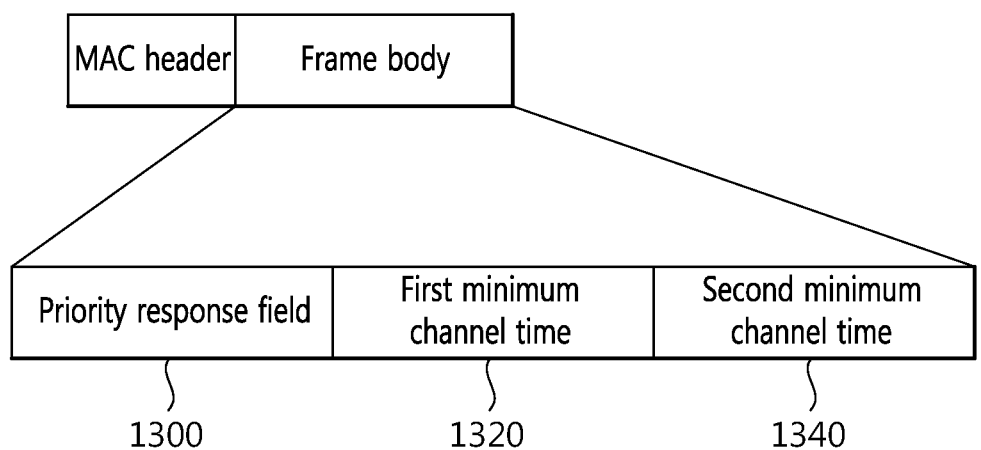
FIG. 13 is a conceptual diagram illustrating the probe request frame according to an embodiment of the present invention.

FIG. 13 is a conceptual diagram illustrating the probe request frame according to an embodiment of the present invention.

Referring to FIG. 13, the probe request frame may include at least one of a priority response field 1300, a first minimum channel time field 1310, and a second minimum channel time field 1320 in the frame body.

The priority response field 1300 may include the information of whether to specify the first priority AP that preferentially transmits the probe response frame or not.

The first minimum channel time field 1310 may include the information of a specified time when the first priority AP preferentially transmits the probe response frame.

The second minimum channel time field 1320 may include the information of a specified time when the second priority AP transmits the probe response frame. This field is an example and such information may be included in the probe request frame in a different format.

FIG. 12 shows that the probe response frame is transmitted with the time section being divided into two sections (the first minimum channel time and the second minimum channel time) depending on whether it is a first priority AP or a second priority AP. However, the probe response frame may be received from the APs that are different in priority by dividing into two or more time sections.

Figure 14:
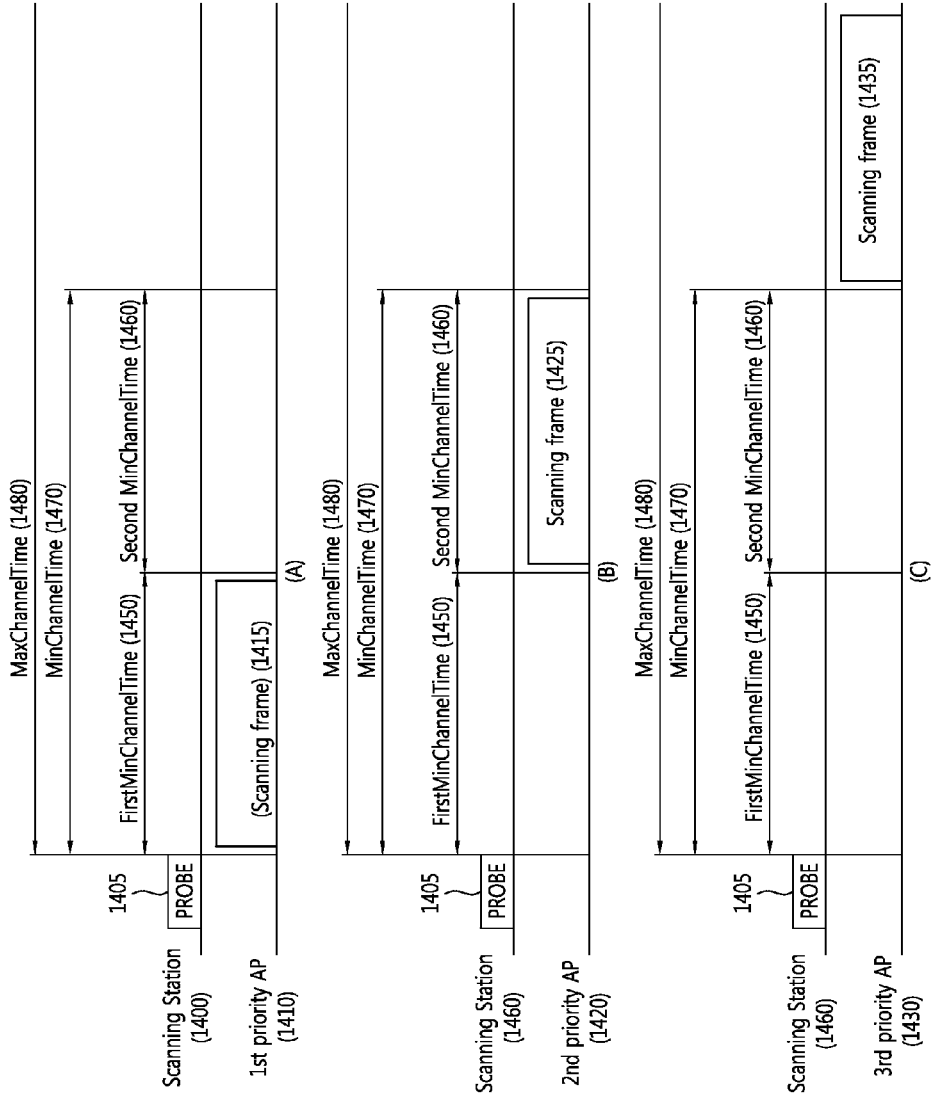
FIGS. 14A, B and C are conceptual diagram illustrating the scanning procedure between an AP and a STA according to an embodiment of the present invention.

FIG. 14 is a conceptual diagram illustrating the scanning procedure between an AP and a STA according to an embodiment of the present invention.

Referring to FIG. 4, according to the probe response frame transmission priority of the AP, in the first minimum channel time 1450, the second minimum channel time 1460, the third minimum channel time, the AP may transmit the probe response frame to the STA 1400. It is referred to as the first priority AP 1410 for the AP that transmits the probe response frame at the first minimum channel time 1450, the second priority AP 1420 for the AP that transmits the probe response frame at the second minimum channel time 1460, and the third priority AP 1430 for the AP that transmits the probe response frame at the third minimum channel time.

Such information of the priority may be distinguished based on the multiple desired SSID list. In case of FIG. 14, the AP may be classified into 3 priorities.

For the convenience of description, the first minimum channel time 1450 and the second minimum channel time 1460 may be defined as the time section included within the minimum channel time 1470, and the third minimum channel time may be defined as the time section from the minimum channel time 1470 to the maximum channel time 1480. The time section is defined as an example, and the first minimum channel time 1450, the second minimum channel time 1460 and the third minimum channel time may be defined differently from FIG. 14 and this embodiment also falls into the scope of the present invention.

The first AP, the second AP, and the third AP may determine the information of the timing when the probe response frame is going to be transmitted based on the SSID list information that is included in the probe request frame received. It is described assuming that the first AP is the first priority AP 1410, the second AP is the second priority AP 1420, and the third AP is the third priority AP 1430.

(1) The first AP may determine the priority based on the SSID list of the probe request frame. As the result, the first AP is the first priority AP 1410 and the probe response frame may be transmitted to the STA 1400 at the first minimum channel time 1450.

(2) The second AP may determine the priority based on the SSID list of the probe request frame. As the result, the second AP is the second priority AP 1420 and the probe response frame may be transmitted to the STA 1400 at the second minimum channel time 1460.

(3) The third AP may determine the priority based on the SSID list of the probe request frame. As the result, the third AP is the third priority AP 1430 and the probe response frame may be transmitted to the STA 1400 at the third minimum channel time.

As aforementioned, in case that different scanning frames (a beacon frame, a FILS beacon frame, a measurement pilot frame) are transmitted at each of the minimum channel time, each AP may not transmit the probe response frame. Also, it is supposed that the AP specified in the order of priority may not transmit the probe response frame beyond a specified transmission time, however, the AP corresponding to each priority may transmit the probe response frame. For example, the first priority AP may transmit the probe response frame at the first minimum channel time only but may transmit it after the first minimum channel time as well.

In case that the STA receives the scanning frame from the AP at each channel time, the scanning procedure may be terminated. For example, in case that the probe response frame is transmitted from the first AP at the first minimum channel time, the STA may not wait to check whether another probe response frame is transmitted and immediately process the received probe response frame and terminate the scanning procedure. This is only an example and in case that the probe response frame is received at the first minimum channel time, the STA may receive the probe response frame that is transmitted from the AP even at the second minimum channel time or the third minimum channel time and terminate the scanning procedure after processing the frame received.

Figure 15:
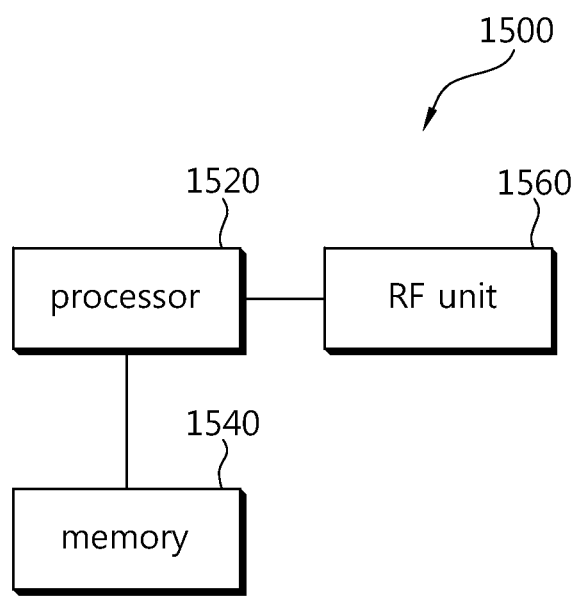
FIG. 15 is a block diagram illustrating the wireless apparatus in which an embodiment of the present invention can be implemented.

FIG. 15 is a block diagram illustrating the wireless apparatus in which an embodiment of the present invention can be implemented.

Referring to FIG. 15, the wireless apparatus is the STA that may implement the embodiments described above, and may also be an AP or non-AP station.

The wireless apparatus 1500 includes a processor 1520, a memory 1540 and a radio frequency (RF) unit 1560.

The RF unit 1560 may be connected to the processor 1520 and transmits/receives the radio signal.

The processor 1520 implements the proposed functions, processes and/or methods. For example, the processor 1520 may be configured to perform the operation of the wireless apparatus according to the embodiments of the present invention described above.

For example, in case that the wireless apparatus is the STA, the processor 1520 may transmit the probe request frame including the scanning priority for multiple access points (APs) and monitor whether a probe response frame is received as a response to the probe request frame from at least one of the multiple APs sequentially based on the scanning priority.

In addition, in case that the wireless apparatus is the AP, the processor 1520 may be implemented to transmit the beacon frame in case that the transmission time of the beacon frame is overlapped with the transmission time of the probe response frame, and transmit the probe response frame in case that the transmission time of the beacon frame is not overlapped with the transmission time of the probe response frame.

The processor 1520 may include Application-Specific Integrated Circuits (ASICs), other chipsets, logic circuits, data processors and/or convertors that reciprocally convert baseband signals and radio signals. The memory 1540 may include Read-Only Memory (ROM), Random Access Memory (RAM), flash memory, memory cards, storage media and/or other storage devices. The RF unit 1560 may include one or more antennas to transmit and/or receive the radio signal.

When the embodiment is implemented in software, the aforementioned scheme may be implemented as a module (process or function) that performs the aforementioned function. The module may be stored in the memory 1540 and executed by the processor 1520. The memory 1540 may be placed inside or outside the processor 1520 and may be connected to the processor 1520 using a variety of well-known means.

What is claimed is:

1. A method for scanning of a station (STA), comprising:
   transmitting a probe request frame including a scanning priority for a first access (AP) and a second AP, wherein the probe request frame includes a service set identifier (SSID) list indicating the first AP and the second AP, wherein the scanning priority is determined based on the SSID list;
   monitoring whether a first probe response frame is received as a response to the probe request frame, during a first channel duration, from the first AP based on the scanning priority; and
   monitoring whether a second probe response frame is received as a response to the probe request frame, during a second channel duration, from the second AP based on the scanning priority, wherein the first channel duration precedes the second channel duration,
   wherein the scanning priority is the priority of probe response frame transmissions of each of the first probe response frame and the second probe response frame;
   wherein monitoring whether the second probe response frame is received during the second channel duration from the second AP is performed when the first probe response frame is not received from the first AP during the first channel duration.

2. The method of claim 1,
   wherein the probe request frame includes information on the first channel duration and the second channel duration.

3. The method of claim 1, wherein the first AP has the highest priority among the first AP and the second AP, wherein the second AP has the next highest priority among the first AP and the second AP.

4. A wireless apparatus for scanning in a wireless local area network system, the wireless apparatus comprising:
   a radio frequency (RF) unit that transmits and receives radio signals; and
   a processor that:
   controls the RF unit to transmit a probe request frame including a scanning priority for first access point (AP) and a second AP, wherein the probe request frame includes a service set identifier (SSID) list indicating the first AP and the second AP, wherein the scanning priority is determined based on the SSID list,
   monitors whether a first probe response frame is received as a response to the probe request frame during a first channel duration from at the first AP based on the scanning priority, and
   monitors whether a second probe response frame is received as a response to the probe request frame during a second channel duration from the second AP based on the scanning priority, wherein the first channel duration precedes the second channel duration,
   wherein the scanning priority is the priority of probe response frame transmissions of each of the first probe response frame and the second probe response frame;
   wherein the processor monitors whether the second probe response frame is received during the second channel duration from the second AP when the first probe response frame is not received from the first during the first channel duration.

5. The wireless apparatus of claim 4, wherein the probe request frame includes information on the first channel duration and the second channel duration.

6. The wireless apparatus of claim 4, wherein the first AP has the highest priority among the first AP and the second AP, wherein the second AP has the next highest priority among the first AP and the second AP.

* * * * *